Patented May 17, 1932

1,859,253

UNITED STATES PATENT OFFICE

ROY CROSS, OF KANSAS CITY, MISSOURI, ASSIGNOR TO SILICA PRODUCTS COMPANY, OF KANSAS CITY, MISSOURI, A CORPORATION OF DELAWARE

CONCRETE CURING AGENT

No Drawing.    Application filed July 10, 1929. Serial No. 377,329.

This invention relates to improvements in the methods of curing of concrete, particularly for treating fresh concrete surfaces such as those of concrete roads. In and during the curing of concrete it is desirable to maintain throughout the entire body of the concrete a fairly uniform water content and it is particularly desirable to keep the surface moist, either by providing for the water lost by evaporation or by sealing in the water to prevent evaporation. In the present invention it is an object to provide and hold enough water for continuance of hydration in the concrete without the necessity of "ponding" or spraying.

In the method of the present invention the surface of recently placed concrete is protected by the presence of water, provided in the form of a shielding gel coating. This gel contains a small amount of mineral matter that has little effect on the concrete other than to intensify the hardening action. Various inorganic gelling agents may be used, including any inorganic substance that will combine with and hold a large amount of water. Typical of these substances is a natural mineral known as bentonite, found in South Dakota, Wyoming, Utah, Nevada and California. Bentonite is a hydrated silicate of alumina (not a clay or kaolin) containing a very large percentage of chemically combined silica and capable of forming a gel with from 200 to 3,000 per cent of water. The gelling action of the bentonite may be intensified by the addition of such substances as magnesium oxide, calcium silicate, sodium silicate, Portland cement, blast furnace slag and similar substances that act in improving the gel forming action of the bentonite.

In order to prevent the too rapid drying of the gel, oil may be mixed with the bentonite. Any type of oil may be used; typical oils being ordinary fuel oil, coal tar, asphalt cut back with lighter oil, oil distillates or other bitumen. As an illustration of a suitable oiled composition the following is representatives:

|   | Parts |
|---|---|
| Wyoming bentonite | 100 |
| Fuel oil consisting of thin residual oil of low viscosity and low cold test | 10 |
| Magnesium oxide | 2 |

This composition which is of a brownish color and thick consistency if liquid may be sprinkled or if a powder may be dusted over the fresh, wet concrete road or other surface and there wet with water to form a gel on the surface. Preferably, however, the material is mixed preliminarily with water in a suitable container and then the admixture is sprayed over the freshly finished surface. In a typical case, one pound of the dry mixture is used for each two gallons of water and the wet material thrown over the surface of the concrete by any suitable means.

Where the concrete surfaces are inclined or vertical, less water may be used and the mixture may be painted on the surface as soon as the latter has partly set. In many instances it is suitable, desirable or preferable to mix the compound herein set out with the entire concrete or with the top finish in the concrete mixer, thus integrally improving the curing and hardening properties of the concrete.

It is obvious that any mineral inorganic substances that will form a gel with more than 200 per cent of water may be used. Likewise, in connection with the bentonite any substances that will improve the bentonite by increasing its water-holding capacity may be used.

It is to be noted that this mixture is not for the purpose of forming an emulsion, but merely for the purpose of forming a protective gel with a low rate of evaporation.

I claim:

1. A gel suitable for temporarily covering curing concrete which contains bentonite and bitumen.

2. A dry composition suitable for temporarily covering curing concrete when mixed with water, said composition containing bentonite, a small proportion of magnesium oxide and a mineral oil.

3. A gel suitable for temporarily curing concrete which contains bentonite, a small proportion of magnesium oxide, fuel oil and water.

4. A gel suitable for temporarily covering curing concrete which contains bentonite, water and fuel oil.

5. A method of curing concrete under cover which comprises placing on concrete surfaces undergoing cure, a temporary aqueous gel coating containing bentonite.

6. In the curing of concrete, the process which comprises applying to an uncured concrete surface a temporary, protective, aqueous gel coating containing bentonite, whereby the evaporation of water from the concrete surface is delayed.

7. The process of claim 6 in which a small proportion of magnesium oxide is incorporated in said aqueous gel coating.

8. In the curing of concrete, the process which comprises applying to an uncured concrete surface a temporary, protective, aqueous gel coating, said gel consisting of the following solid ingredients in about the proportions by weight of bentonite, 100 parts; mineral oil, 10 parts and magnesium oxide, 2 parts.

In testimony whereof, I have hereunto affixed my signature.

ROY CROSS.

CERTIFICATE OF CORRECTION.

Patent No. 1,859,253.      May 17, 1932.

ROY CROSS.

It is hereby certified that error appears in the printed specification of the above numbered patent requiring correction as follows: Page 2, line 5, claim 3, after the word "temporarily" insert the word covering; and that the said Letters Patent should be read with this correction therein that the same may conform to the record of the case in the Patent Office.

Signed and sealed this 12th day of July, A. D. 1932.

(Seal)      M. J. Moore,
Acting Commissioner of Patents.

rarily covering curing concrete when mixed with water, said composition containing bentonite, a small proportion of magnesium oxide and a mineral oil.

3. A gel suitable for temporarily curing concrete which contains bentonite, a small proportion of magnesium oxide, fuel oil and water.

4. A gel suitable for temporarily covering curing concrete which contains bentonite, water and fuel oil.

5. A method of curing concrete under cover which comprises placing on concrete surfaces undergoing cure, a temporary aqueous gel coating containing bentonite.

6. In the curing of concrete, the process which comprises applying to an uncured concrete surface a temporary, protective, aqueous gel coating containing bentonite, whereby the evaporation of water from the concrete surface is delayed.

7. The process of claim 6 in which a small proportion of magnesium oxide is incorporated in said aqueous gel coating.

8. In the curing of concrete, the process which comprises applying to an uncured concrete surface a temporary, protective, aqueous gel coating, said gel consisting of the following solid ingredients in about the proportions by weight of bentonite, 100 parts; mineral oil, 10 parts and magnesium oxide, 2 parts.

In testimony whereof, I have hereunto affixed my signature.

ROY CROSS.

CERTIFICATE OF CORRECTION.

Patent No. 1,859,253. May 17, 1932.

ROY CROSS.

It is hereby certified that error appears in the printed specification of the above numbered patent requiring correction as follows: Page 2, line 5, claim 3, after the word "temporarily" insert the word covering; and that the said Letters Patent should be read with this correction therein that the same may conform to the record of the case in the Patent Office.

Signed and sealed this 12th day of July, A. D. 1932.

(Seal)

M. J. Moore,
Acting Commissioner of Patents.

CERTIFICATE OF CORRECTION.

Patent No. 1,859,253.                                                               May 17, 1932.

ROY CROSS.

It is hereby certified that error appears in the printed specification of the above numbered patent requiring correction as follows: Page 2, line 5, claim 3, after the word "temporarily" insert the word covering; and that the said Letters Patent should be read with this correction therein that the same may conform to the record of the case in the Patent Office.

Signed and sealed this 12th day of July, A. D. 1932.

M. J. Moore, (Seal)                                          Acting Commissioner of Patents.